Dec. 8, 1959           R. H. MILLER           2,916,097

REVERSIBLE DISK PLOW

Filed April 19, 1956                               3 Sheets-Sheet 2

Inventor
Robert H. Miller
Paul O. Pippel
Attorney

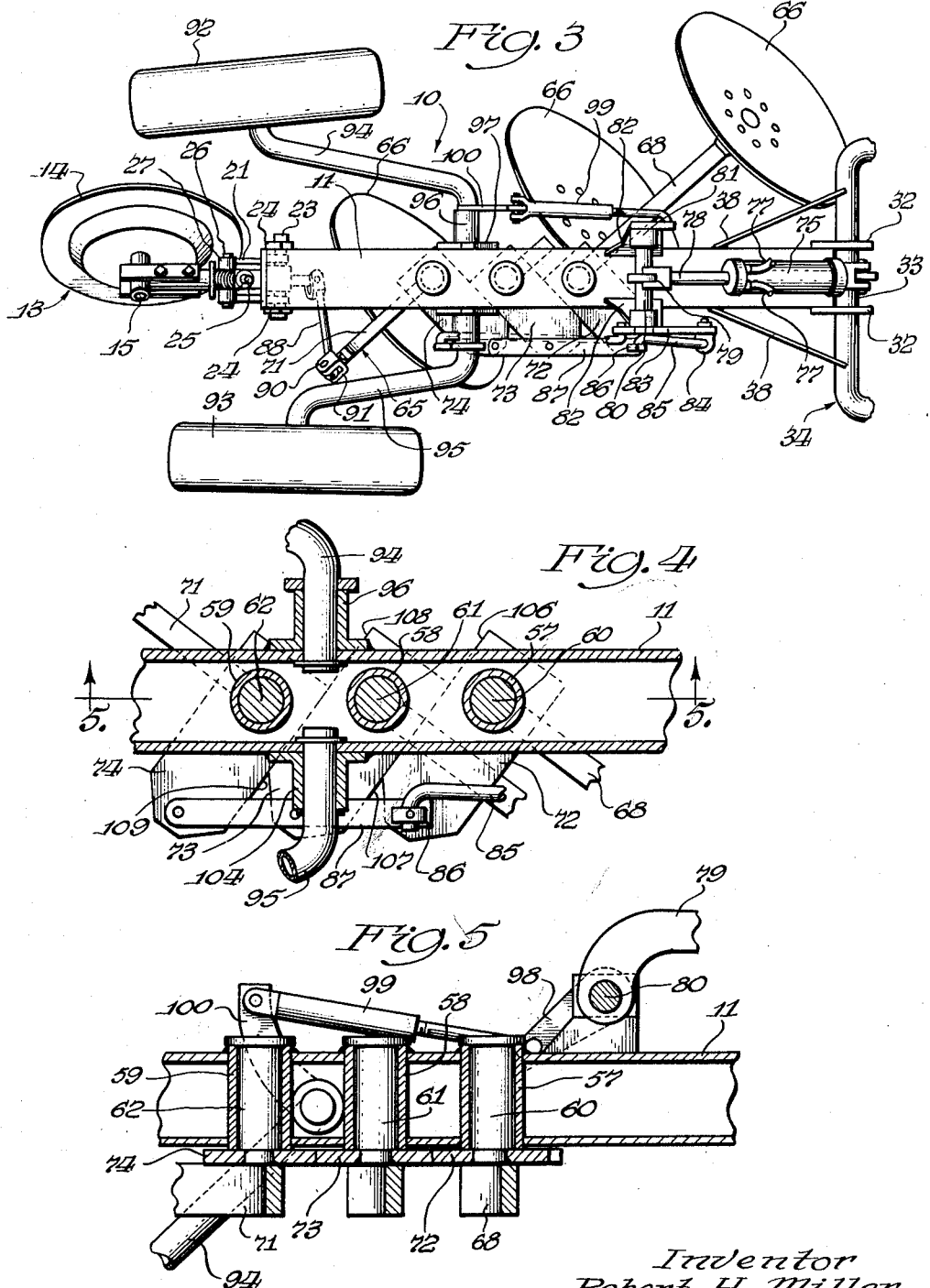

United States Patent Office 2,916,097
Patented Dec. 8, 1959

2,916,097

REVERSIBLE DISK PLOW

Robert H. Miller, Memphis, Tenn., assignor to International Harvester Company, a corporation of New Jersey Application April 19, 1956, Serial No. 579,270

7 Claims. (Cl. 172—212)

This invention relates to agricultural implements and particularly to plows. More specifically the invention concerns a two-way reversible disk plow and especially one that can be mounted on a tractor to be transported thereby.

An object of the invention is the provision of a reversible disk plow of novel construction wherein the disks are individually mounted on a relatively stationary frame in such a way as to be aligned diagonally to the direction of travel, and the direction of plowing is reversed by realigning the disks on the opposite diagonal.

Another object of the invention is the provision of improved means for controlling the operating characteristics of a reversible disk plow, including a novel gauge wheel mounting for controlling the operating depth.

Another object of the invention is the provision in a reversible disk plow of novel means for reversing the disks which includes a novel means for limiting the lateral swinging thereof.

While the invention is shown and described therein in its application to a three-disk plow, it is equally applicable to a plow having a greater or lesser number of disks.

Other objects and advantages of the invention will become clear from the following detailed description when read in conjunction with the accompanying drawings, wherein:

Figure 3 is a plan view similar to Figure 2 showing the reversed position of the disk gang;

Figure 4 is an enlarged sectional detail showing the operating means for reversing the disks, and Figure 5 is a sectional elevation taken on the line 5—5 of Figure 4.

Figure 1:
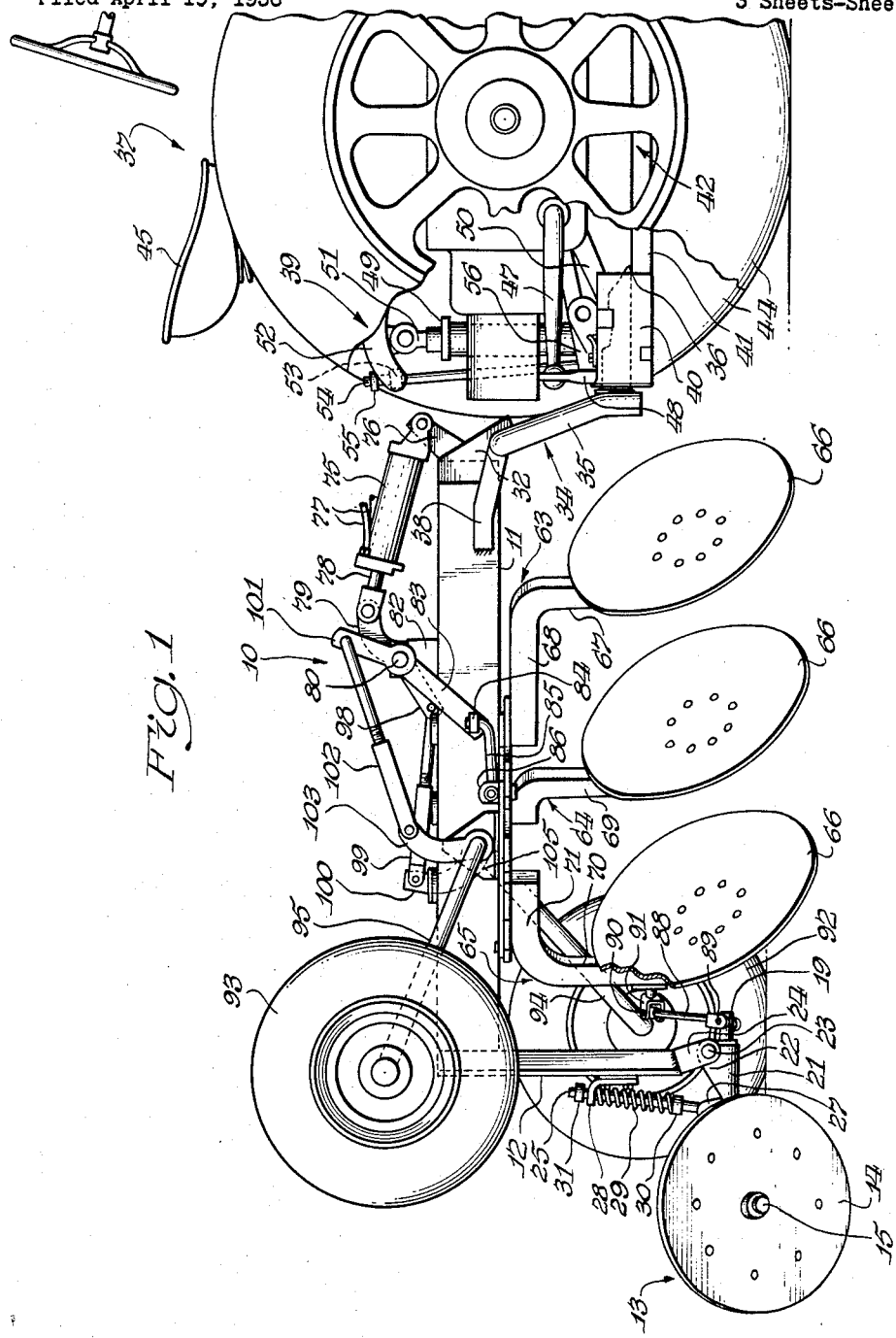
Figure 1 is a view in side elevation of the rear end of a tractor, with parts broken away, showing mounted thereupon a reversible disk plow incorporating the features of this invention.

Referring to the drawings, the implement of this invention is generally designated by the numeral 10 and includes a longitudinally extending tubular box section main frame 11 having affixed to its rear end and depending therefrom a channel shaped upright 12.

Upright 12 supports at its lower end a rear furrow wheel unit 13 comprising a wheel 14 mounted on a stub axle 15 rotatable in a bearing 16 secured between a pair of straps 17 straddling a sleeve 18 in which is mounted a shaft 19, the shaft, sleeve and straps being secured together by bolts 20. Shaft 19 extends horizontally forwardly and a portion thereof projecting beyond sleeve 18 is rotatably received in another sleeve member 21 having a boss portion 22 carrying a transverse pivot pin 23 supported at its ends by lugs 24 affixed to and depending from the lower end of upright member 12 of the frame. The furrow wheel unit 13 is thus capable of vertical pivoting around the axis of the pin 23, and the furrow wheel is urged downwardly by the provision of a rod 25 pivotally mounted at its lower end upon a pin 26 carried between a pair of ears 27 projecting upwardly from sleeve 21. The upper end of rod 25 is slidably receivable in an opening provided in the bracket 28 secured to frame member 12, and is surrounded by a spring 29 the upper end of which abuts the bracket 28 and the lower end, a collar 30. Downward movement of the furrow wheel relative to the implement frame is limited by the provision of a collar 31 at the upper end of rod 25. At this point it should be clear that due to the rotational mounting of shaft member 19 in sleeve 21, the furrow wheel 14 carried at the end of the shaft is capable of rocking about a longitudinal axis between the positions indicated in Figures 2 and 3, corresponding to the right and left hand plowing positions, respectively, of the disk gangs. The manner in which this shifting of the furrow wheel is accomplished will be explained hereinafter.

The forward end of the main frame 11 of the implement has affixed thereto a pair of brackets 32 which are secured to the transverse portion 33 of a bail shaped member 34, the downwardly turned ends 35 of which have secured thereto forwardly projecting shaft members 36.

Bail member 34 constitutes a hitch frame by which the implement of this invention may be attached to a tractive vehicle such as the tractor 37, and is strengthened by the provision of a pair of braces 38 extending from the transverse portion 33 of the bail to the main supporting frame member 11. Laterally spaced shaft members 36 are adapted for attachment to the implement attaching structure 39 of the tractor, which includes laterally spaced longitudinally elongated socket members 40 in which the respective shaft members 36 are slidably received to form an integral tractor-implement connection, and these socket members 40 are secured to the rear ends of laterally spaced arms 41 of a drawbar 42, which is connected to the tractor in draft-receiving relation at a location, not shown, in advance of the transverse rear axle structure 43 thereof. Drawbar 42 is pivotally connected to the tractor in such a way to accommodate vertical adjustment of the rear end thereof between positions corresponding to the operating and transport positions of the implement, whereby the implement may be raised and lowered for transport purposes and to facilitate reversing the direction of operation of the earth-working tools.

It may be understood that the tractor 37 is of a conventional type having laterally spaced rear drive wheels 44 and an operator's station 45. The specific apparatus by which the drawbar 42 and the implement 10 are raised and lowered forms no part of this invention. However, it may be noted that a rockshaft 46 mounted on the tractor is provided at its ends with rearwardly extending lift arms 47, the ends of which are connected by lift links 48 with the socket members 40 whereby rocking of shaft 46 raises and lowers drawbar 42 and the implement. In Figure 1 may be seen a hydraulic ram 49 anchored at its lower end to a bracket 50 affixed to the tractor body and provided with a piston rod 51 connected to a link 52 suitably pivotally mounted on the tractor body in a manner not shown. The end of link 52 is provided with a swivel 53 which slidably receives a lift rod 54 having a collar 55 at its upper end, and the lower end of which is pivotally connected to a lift arm 56 secured to the transverse shaft 46. Thus upon actuation of the arm 49 to extend piston rod 51, lift rod 54 rocks shaft 46 and arms 47 to vertically move the drawbar 42 and therefore the implement 10.

As pointed before the implement of this invention is a reversible disk plow adapted for right and left hand plowing. The main supporting frame 11 is provided with vertical, longitudinally aligned bearings 57, 58 and 59 (see Figs. 4 and 5) in which are mounted the vertical spindle portions 60, 61 and 62 of disk standards 63, 64 and 65, respectively, each of which supports a disk 66.

Figure 2:
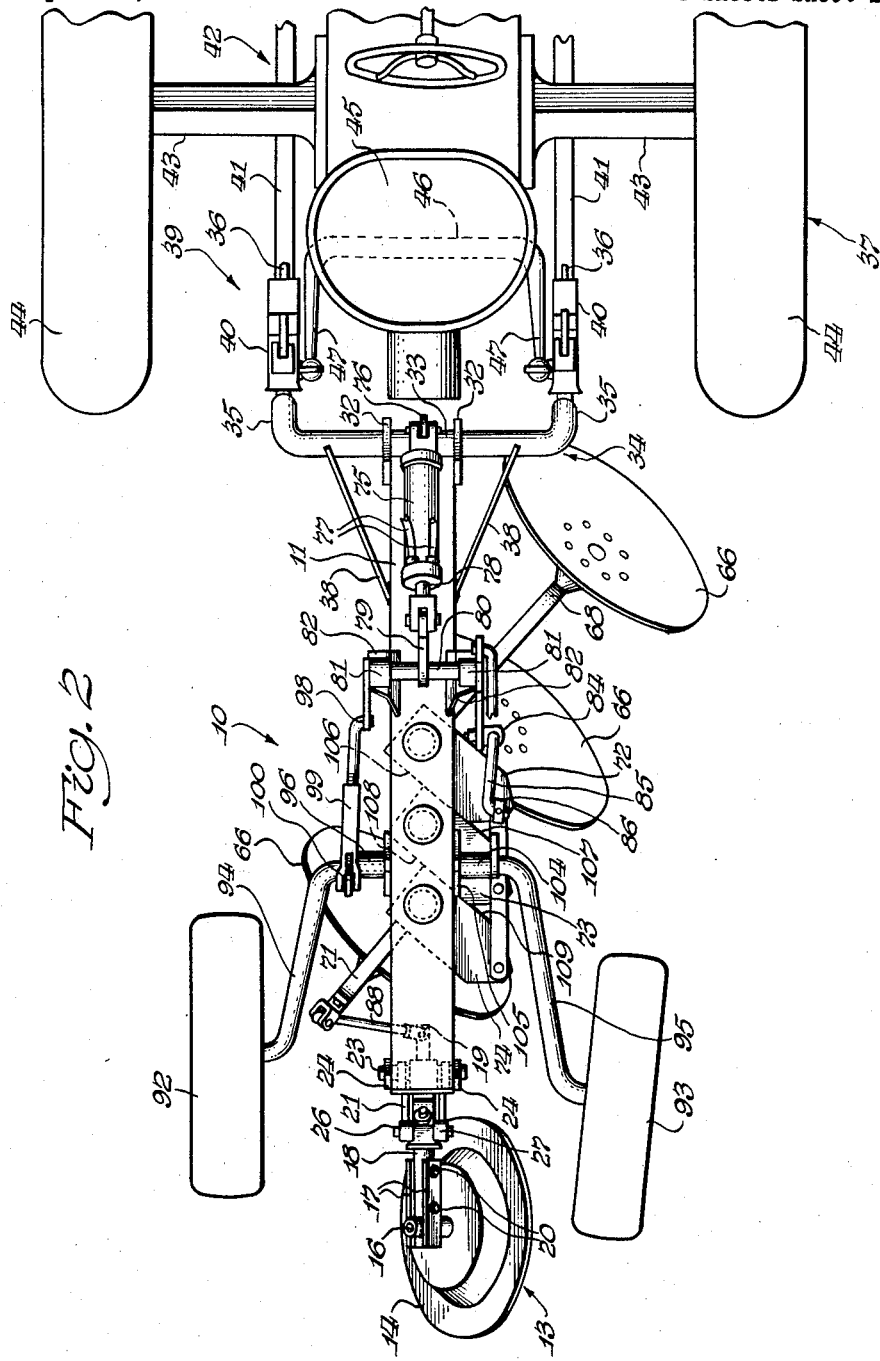
Figure 2 is a plan view, with parts removed for clarity, of the structure shown in Figure 1 with the gang of disks shown as operating on the right hand diagonal.

Standard 63 is provided with a vertical disk carrying portion 67 upon the lower end of which is mounted one of the disks 66, and is connected to the vertical spindle portion 60 by an elongated outwardly extending radial portion 68, shown in Figure 2 as extending outwardly on the right hand diagonal. The central standard 64 includes a vertical disk-carrying portion 69 connected on a short radius to its associated vertical spindle portion 61 so that the disk 66 carried thereby is generally diagonally aligned with the forward disk 66 carried by standard 63. The rearmost standard 65 is provided with a vertical disk-carrying portion 70, connected to the corresponding vertical spindle portion 62 by an elongated horizontal arm portion 71, which extends outwardly and rearwardly from the side of the frame 11 opposite the horizontal portion 68 of standard 63, so that the disk 66 carried thereby is generally in diagonal alignment with the disks on standards 63 and 64.

The disk gang represented by disks 66 is shown in Figure 1 on the right hand diagonal for right hand plowing, and in Figure 3 the disk gang has been swung laterally to the opposite diagonal for left hand plowing, that is, for plowing in the reverse direction with respect to the field being plowed. The center disk 66 swings laterally on a relatively short radius about the axis of spindle 61. Rearmost disk 66, in moving to the left hand diagonal, swings to the right on a relatively longer radius arm 71 about the axis of spindle 62. The two forward disks swing to the left to align themselves on the left hand diagonal with the rearmost disk, the foremost disk 66 swinging laterally on a longer radius than either the middle or rearmost disks about the axis of forward spindle 60.

Lateral swinging of the disks to reverse the position of the gang and the direction of plowing is accomplished by the provision of lever arms in the form of rectangularly shaped plates 72, 73 and 74 affixed, respectively, to the spindles 60, 61 and 62 below the frame 11.

Power for swinging the levers 72, 73 and 74 is supplied by mechanism which includes power operated means in the form of a hydraulic cylinder 75 pivotally mounted on a bracket 76. Cylinder 75 is the double acting or two-way type and is supplied with fluid under pressure through hose lines 77 from a source of fluid under pressure, not shown, on the tractor. A piston rod 78 slidable in the cylinder is pivotally connected to a lever 79 affixed to a transverse rock shaft 80 rotatably mounted in bearings 81 carried by a pair of brackets 82 affixed and projecting upwardly from the supporting frame 11. Thus extension and retraction of piston rod 78 in the cylinder 75 rocks lever 79 and shaft 80.

An arm 83 affixed to one end of shaft 80 and depending therefrom, has a swivel 84 mounted at the lower end thereof and pivotally receiving the bent end of a link 85, the other end of which is pivotally received in another swivel 86 mounted on the forward end of a strap 87. Strap 87 extends across and is pivotally connected to each of the plates or lever arms 72, 73 and 74 so that, upon operation of the hydraulic cylinder 75, shaft 80 and arm 83 are rocked and motion is transmitted through link 85 to swing said lever arms simultaneously about the axes of the spindles 60, 61 and 62, thus swinging the disk gang from one of its operating positions to the other. This operation of reversing the disk gang is accomplished when the implement is elevated above the ground by the lifting apparatus on the tractor and this usually occurs when reversing the direction of plowing at the end of the field.

At the same time that the disk gang is swung from one diagonal to the other, as from the position of Figure 2 to that of Figure 3, it is also necessary to reverse the position of the rear furrow wheel 14. For this purpose the shaft 19 is rocked about its axis to shift the furrow wheel from the position of Figure 2 to that of Figure 3, and this is accomplished by the provision of a lever arm in the form of a rod 88, the lower end of which is bifurcated and pivotally mounted upon a pin 89 seated in the shaft 19. The upper end of rod 88 is slidably received in an opening provided in a pin 90 pivotally carried in a swivel member 91 mounted on the lower end of the vertical portion 70 of disk standard 65 at the rear of the gang. Thus, by virtue of the pivotal and slidable connection of rod 88 with swivel member 91, the lateral swinging motion of rear disk standard 65 is transmitted through rod 88 to rock the shaft 19 and to swing disk 14 about the axis thereof from one operating position to another corresponding to the operating positions of the gang of disks. The sliding connection of rod 88 with standard 65 accommodates transmission of motion from the standard to the furrow wheel throughout the range of lateral swinging of the standard. Likewise, the reversal of the position of the furrow wheel is accomplished in response to and simultaneously with the reversal of the positions of the disks 66.

Means are also provided for gauging the operating depth of the reversible disk plow of this invention in the alternate operating positions thereof, and this is accomplished by the provision of a pair of left and right hand gauge wheels 92 and 93, which are mounted upon the laterally turned ends of a pair of crank axles 94 and 95, respectively.

It will be noted in the position of the parts in Figure 1 that crank axle 94 extends downwardly and rearwardly and its upper end is bent inwardly and pivotally mounted in a bearing 96 carried by a bracket 97 affixed to the side of frame 11. In Figures 1 and 2 the disk gang is shown in position for right hand plowing, and gauge wheel 92 is functioning to regulate and maintain the operating depth of the disks, and is shown resting on unplowed ground.

At the same time that axle 94 extends downwardly and rearwardly and gauge wheel 92 is in operating position, axle 95 on the right hand side of the tool frame extends upwardly and rearwardly and the gauge wheel 93 thereon is in an inoperative or transport position. Rocking of crank axles 94 and 95 simultaneously to automatically place one wheel in operation while the other is elevated to a non-operating position is accomplished by the provision at one end of shaft 80 of a downwardly extending rock arm 98, the lower end of which is pivotally connected to an adjustable push rod 99, the upper end of which is pivotally connected to an arm 100 affixed to and projecting upwardly from the inwardly turned end of crank axle 94. The other end of shaft 80 has secured thereto an upwardly extending arm 101 which is pivotally connected to one end of a push rod 102, the other end of which is pivotally connected to the upper end of an arm 103 secured to the inwardly turned upper end of crank axle 95, the projecting end of which is rotatably received in a bearing 104 carried by a bracket 105 mounted on the side of the tool frame 11. Thus, upon rocking shaft 80, arms 98 and 101 swing in opposite directions to vertically swing the crank axles 94 and 95 in opposite directions. It will also be observed that this swinging of the crank axles 94 and 95 and the gauge wheels carried thereby is automatically accomplished in synchronism with the shifting of the furrow wheel and the lateral swinging of the disk standards by the horizontal swinging of plates or lever arms 72, 73 and 74 by operation of the hydraulic cylinder 75.

In order to limit the lateral swinging and therefore fix the operating position of the disk gang on alternate diagonals, plates 72 and 73 are provided with abutment means in the form of adjacent edges 106 and 107, which are in engagement in the operating position of the parts shown in Figure 2, preventing further swinging of the disk standards, and plate 73 is provided with another abutting edge 108 which is in engagement with the adjacent edge 109 of the rearmost lever arm 74. On operation of hydraulic cylinder 75 to shift the disk gang from the position of Figure 2 to that of Figure 3, the plates 72, 73 and 74 swing about the axes of the respective spindles 60, 61 and 62, and the adjacent edges 106, 107 and 108, 109 of the lever arms or plates become separated until the disk gang reaches the left hand diagonal position of Figure 3, whereupon these adjacent edges of the lever arms again function as abutments or stops to limit the lateral swinging of the disk standards.

The operation of reversible disk plow of this invention should be clearly understood from the foregoing description. It should likewise be understood that the invention has been described in its preferred embodiment only, and that modifications may be made in the invention without departing from the spirit thereof or the scope of the appended claims.

What is claimed is:

1. In a two-way plow adapted for attachment to a tractor to be propelled thereby, a supporting frame having means thereon for connection to the tractor in draft-receiving relation, plow means carried by the frame and movable relative thereto between two operating positions, power means on the frame operatively connected to said plow means for moving the latter between right and left hand plowing positions, a rear furrow wheel mounted on the frame adapted to ride in the furrow formed by said plow means, a pair of gauge wheels mounted on the frame, one on each side of said furrow wheel, crank axles carrying said gauge wheels and mounted on said frame for vertical swinging in opposite directions to dispose one of said gauge wheels in operating position riding on unplowed ground while the other said gauge wheel is in an inoperative position, and means operatively connecting said power means to said gauge wheels to alternately swing one of the latter to a position corresponding to the plowing position of said plow means.

2. In a two-way plow adapted for attachment to a tractor to be propelled thereby, a supporting frame having means thereon for connection to the tractor in draft-receiving relation, plow means carried by the frame and movable relative thereto between two operating positions, power means on the frame operatively connected to said plow means for moving the latter between right and left hand plowing positions, a rear furrow wheel mounted on the frame adapted to ride in the furrow formed by said plow means, a pair of gauge wheels mounted on the frame, one on each side of said furrow wheel, crank axles carrying said gauge wheels and mounted on said frame for vertical swinging in opposite directions to dispose one of said gauge wheels in operating position riding on unplowed ground while the other said gauge wheel is in an inoperative position, means operatively connecting said power means to said gauge wheels to alternately swing one of the latter to a position corresponding to the plowing position of said plow means, and means operatively connecting said power means to said furrow wheel for simultaneously moving the latter between positions corresponding to the right and left hand plowing positions of said plow means.

3. The invention set forth in claim 1, wherein said power means includes a two-way hydraulic ram mounted on the supporting frame and operatively connected to said crank axles, said ram being alternately extensible and retractable to rock one of said crank axles downwardly and the other upwardly simultaneously to place one gauge wheel in operating position while the other is elevated.

4. In a two-way disk plow, a longitudinally extending supporting frame having hitch means for the attachment of the front end thereof to a tractor, a disk gang mounted on the supporting frame for lateral swinging between opposite diagonals with respect to said frame to dispose said gang alternately in positions for right and left hand plowing, comprising at least two vertical spindle members rotatably mounted in longitudinally spaced relationship on said frame, means, means for rotating said spindle members including actuating arms affixed to said spindles and extending radially therefrom generally parallel to each other, power means on the plow operatively connected to said arms for swinging the latter to rotate said spindles and laterally swing the gang between its alternate operating positions, said arms being engageable with each other after a predetermined movement thereof in either direction to limit the rotation of said spindles.

5. The invention set forth in claim 4, wherein said actuating arms are plates having parts thereof projecting radially toward each other from the axes of said spindles, said parts having adjacent opposed straight edges engageable with each other to limit the rocking of said arms and therefore the rotation of said spindles.

6. The invention set forth in claim 5, wherein said adjacent opposed straight edges are substantially parallel throughout their range of rocking movement from their position of greatest spacing midway of said alternate plowing positions to an engaged position when said plowing positions are reached.

7. In a two-way plow adapted for attachment to a tractor to be propelled thereby, a supporting frame having means thereon for connection to the tractor in draft-receiving relation, plow means carried by the frame and movable relative thereto between two operating positions, power means on the frame operatively connected to said plow means for moving the latter between right and left hand plowing positions, a rear furrow wheel mounted on the frame adapted to ride in the furrow formed by said plow means, a pair of gauge wheels mounted on opposite sides of the frame, crank axles carrying said gauge wheels and mounted on said frame for swinging in a vertical plane in opposite directions to dispose one of said gauge wheels in operating position riding on unplowed ground while the other said gauge wheel is in an inoperative position, and means operatively connecting said power means to said gauge wheels to alternately swing one of the latter to a position corresponding to the plowing position of said plow means.

References Cited in the file of this patent

UNITED STATES PATENTS

| 1,388,142 | Cook | Aug. 16, 1921 |
| 2,561,032 | Onfrey | July 17, 1951 |
| 2,648,267 | Pursche | Aug. 11, 1953 |
| 2,732,782 | Gurries et al. | Jan. 31, 1956 |

FOREIGN PATENTS

| 103,299 | Australia | Feb. 18, 1938 |
| 326,808 | France | Mar. 6, 1903 |
| 884,707 | Germany | July 30, 1953 |
| 933,837 | Germany | Oct. 6, 1955 |